(12) United States Patent
Himath et al.

(10) Patent No.: US 11,791,541 B2
(45) Date of Patent: Oct. 17, 2023

(54) BASE STATION ANTENNA

(71) Applicants: PROSE TECHNOLOGIES (AUSTRALIA) PTY LTD, New South Wales (AU); PROSE TECHNOLOGIES (SUZHOU) CO., LTD., Suzhou (CN); PROSE TECHNOLOGIES LLC, Mount Olive, NJ (US)

(72) Inventors: Priyananda Himath, New South Wales (AU); Zhonghao Hu, New South Wales (AU); Wencai Jing, New South Wales (AU); Yading Tang, New South Wales (AU); Jinju Wang, New South Wales (AU)

(73) Assignees: PROSE TECHNOLOGIES (AUSTRALIA) PTY LTD, New South Wales (AU); PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 228 days.

(21) Appl. No.: 17/527,593

(22) Filed: Nov. 16, 2021

(65) Prior Publication Data
US 2022/0077569 A1 Mar. 10, 2022

Related U.S. Application Data

(63) Continuation of application No. PCT/CN2019/112534, filed on Oct. 22, 2019.

(51) Int. Cl.
*H01Q 1/24* (2006.01)
*H01Q 15/24* (2006.01)
(Continued)

(52) U.S. Cl.
CPC ............ *H01Q 1/246* (2013.01); *H01Q 15/24* (2013.01); *H01Q 21/22* (2013.01); *H04B 1/04* (2013.01); *H04B 1/06* (2013.01)

(58) Field of Classification Search
CPC ........ H01Q 1/246; H01Q 15/24; H01Q 21/22; H01Q 3/005; H01Q 3/06; H01Q 3/30; H04B 1/04; H04B 1/16
(Continued)

(56) References Cited

U.S. PATENT DOCUMENTS

| 5,815,115 A | 9/1998 | Carloni et al. |
| 2003/0146880 A1* | 8/2003 | Chiang ................. H01Q 21/30 343/853 |

(Continued)

FOREIGN PATENT DOCUMENTS

| CN | 101043239 A | 9/2007 |
| CN | 106031297 A | 10/2016 |

(Continued)

OTHER PUBLICATIONS

World Intellectual Property Organization (WIPO) International Search Report for PCT/CN2019/112534 dated Jul. 22, 2020 5 pages (with translation).

*Primary Examiner* — Jean B Jeanglaude
(74) *Attorney, Agent, or Firm* — ANOVA LAW GROUP, PLLC

(57) ABSTRACT

A base station antenna includes a smart bias tee (SBT), an antenna array, a phase shifter, and a filter circuit. The antenna array includes a plurality of antenna elements. The phase shifter includes a plurality of output terminals. Each of the plurality of output terminals is coupled to an antenna element. The filter circuit includes a first filter. An input terminal of the first filter is coupled to either one of output terminals of two ends of the phase shifter. The output terminals are coupled to the SBT. The output terminals of the (Continued)

two ends of the phase shifter have weaker power compared to other output terminals.

11 Claims, 3 Drawing Sheets

(51) Int. Cl.
*H01Q 21/22* (2006.01)
*H04B 1/04* (2006.01)
*H04B 1/06* (2006.01)

(58) Field of Classification Search
USPC .......................................................... 343/702
See application file for complete search history.

(56) References Cited

U.S. PATENT DOCUMENTS

| 2012/0028690 | A1 | 2/2012 | Liu | |
|---|---|---|---|---|
| 2012/0133569 | A1* | 5/2012 | Pivit | ..................... H01Q 1/246 |
| | | | | 343/844 |

FOREIGN PATENT DOCUMENTS

| WO | 2013176370 A1 | 11/2013 |
|---|---|---|
| WO | 2016022182 A1 | 2/2016 |
| WO | 2016150483 A1 | 9/2016 |

* cited by examiner

BASE STATION ANTENNA

CROSS-REFERENCE TO RELATED APPLICATIONS

This application is a continuation application of International Application No. PCT/CN2019/112534, filed on Oct. 22, 2019, the entire content of which is incorporated herein by reference.

TECHNICAL FIELD

The present disclosure generally relates to the mobile communication technology field and, more particularly, to a base station antenna.

BACKGROUND

Smart bias tee (SBT) is usually used in a base station antenna. The SBT is configured to allow an antenna interface standards group (AISG) signal and a direct current (DC) to be transmitted through a radio frequency (RF) terminal without using another AISG terminal. When the SBT is integrated into the base station antenna, on one hand, the SBT is electrically connected to a remote electrical tilt (RET) module. The RET module is configured to provide a remote electrical tilt function for the antenna. A tilt angle may tilt downward. On another hand, a filter needs to be added in an antenna feed network and is configured to filter out an RF signal to further feed the AISG signal and DC signal to the SBT.

However, improper filter settings are likely to cause many problems, such as insertion loss and return wave loss of an RF signal, problems related to a passive inter-modulation (PIM), high requirements for filter isolation, space occupation, etc. For example, the patent document with the international publication number WO 2016022182 A1 discloses a multi-input SBT. The filter of the multi-input SBT is located at a front end of a feed network and at a high power position. Thus, the multi-input SBT is more likely to have a PIM problem. Meanwhile, the multi-input SBT has a high requirement of filter isolation requirements, which has a greater impact on performance of an antenna array. Moreover, the insertion loss and return wave loss of the RF waveband are relatively large.

In addition, in some other existing designs, a phase shifter uses a capacitively coupled RF port, which forces a DC signal to be extracted with high power output through the filter before the phase shifter or before the capacitively coupled RF port. Other solder joints in a high power path will cause RF degradation and possible passive intermodulation and lead to more loss and phase distortion. Meanwhile, a filter with higher isolation needs to be used.

In some other existing designs, the filter is integrated into the last output terminal of the phase shifter in a same structure. Although this method avoids RF attenuation caused by the filter, the filter occupies a relatively large area of the phase shifter printed circuit board (PCB). The portion occupied by the filter may include a grounded layer in a strip wire configuration, which increases the raw material cost of the entire phase shifter. Moreover, the phase shifter occupies a larger space on a back of a reflector.

SUMMARY

Embodiments of the present disclosure provide a base station antenna, including a smart bias tee (SBT), an antenna array, a phase shifter, and a filter circuit. The antenna array includes a plurality of antenna elements. The phase shifter includes a plurality of output terminals. Each of the plurality of output terminals is coupled to an antenna element. The filter circuit includes a first filter. An input terminal of the first filter is coupled to either one of output terminals of both ends of the phase shifter. The output terminals are coupled to the SBT. The output terminals of the two ends of the phase shifter have weaker power compared to other output terminals.

The beneficial effects of the present disclosure include as follows.

(1) By electrically connecting the filter circuit to the antenna elements at the edge of the antenna array, the risk of the passive inter-modulation (PIM) may be minimized.

(2) The filter may be arranged for extracting the AISG signal and the DC signal. The filter may be coupled to any one of the output terminals of both ends of the phase shifter. The output terminals of both ends of the phase shifter may have weaker power compared to other output terminals. On one hand, the return wave loss and the insertion phase of the radio frequency (RF) signal may be reduced, and the impact on the antenna performance may be minimized. On another hand, the output terminals of both ends of the phase shifter may have power several dB less compared to other output terminals. Thus, the filter may reach the specification of 40 dB easily, which relaxes the isolation requirement on the filter.

(3) Only a single circuit board may need to be modified to add the filter circuit, which saves the space and causes the addition of the filter circuit to be more convenient.

REFERENCE SIGNS

10—First filter, 20—Matching circuit, 30—Second filter, A—First node, B—Second node, C1—First capacitor, C2—Second capacitor, L—inductor, D—Electrophoretic discharger.

DETAILED DESCRIPTION OF THE EMBODIMENTS

The technical solutions of embodiments of the present disclosure are described in detail in connection with the accompanying drawings of the present disclosure.

Figure 1:
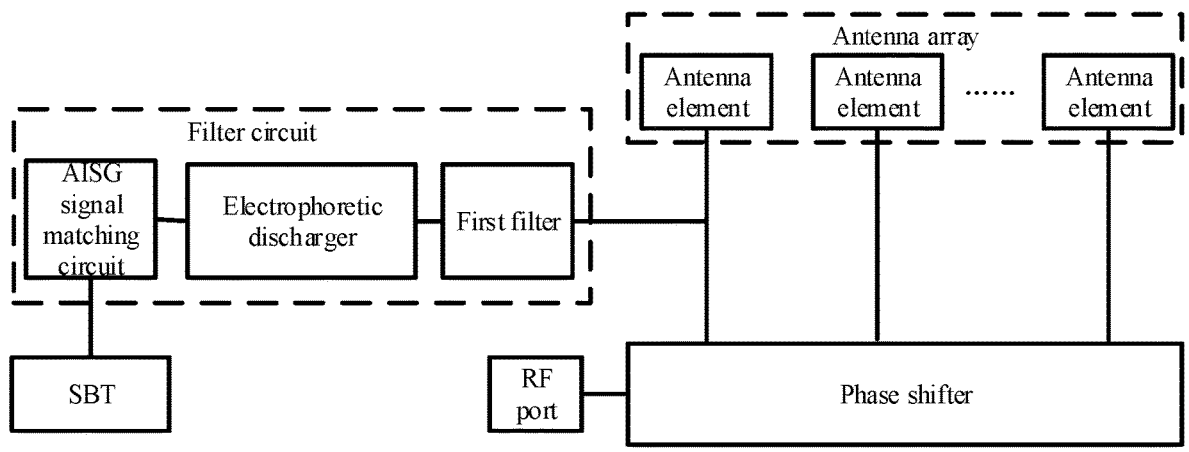
FIG. 1 is a schematic structural block diagram of a base station antenna according to some embodiments of the present disclosure.
Figure 2:
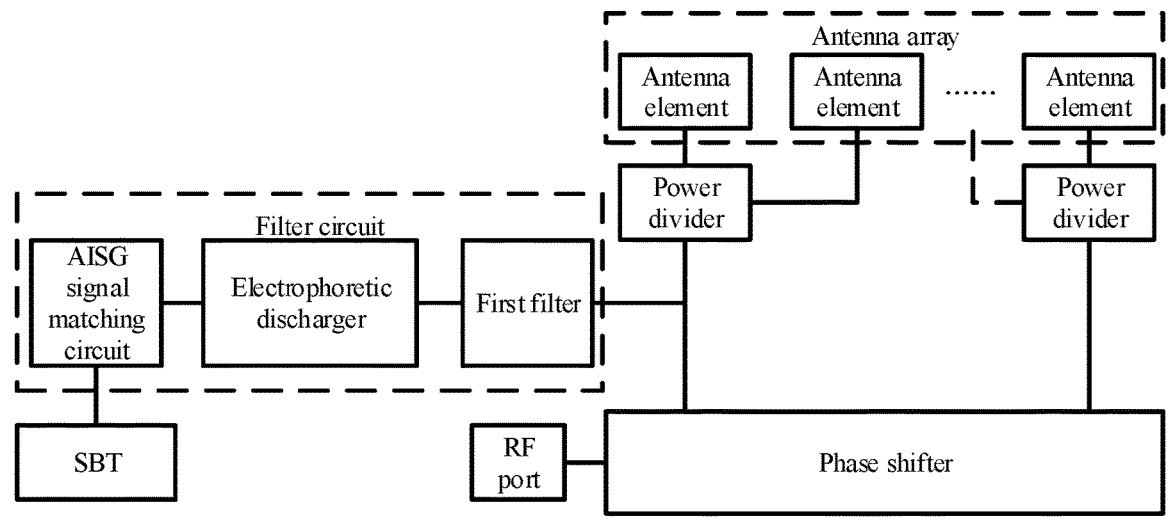
FIG. 2 is a schematic structural block diagram of a base station antenna according to some embodiments of the present disclosure.

In connection with FIGS. 1 and 2, the present disclosure discloses a base station antenna, including an antenna array, a filter circuit, a phase shifter, and a smart bias tee (SBT). The antenna array includes a plurality of antenna elements arranged in an array. An arrangement of the antenna elements may be set according to actual needs. The phase shifter includes a plurality of output terminals. To have a better beamwidth convergence, output terminals at both ends of the phase shifter may have weaker power than other output terminals. Each output terminal may be coupled with at least one antenna element in the antenna array. The filter circuit is electrically connected to antenna elements located at the edge of the antenna array. The filter circuit includes a first filter. An input terminal of the first filter may be coupled to either one of the output terminals at two ends of the phase shifter. The output terminal is coupled to the SBT. In some embodiments, signals entering the first filter include an antenna interface standards group (AISG) signal, a direct current (DC) signal, and a radio frequency (RF) signal. The first filter may be configured to filter out the RF signal. That is, the first filter may be configured to separate the AISG signal and the DC signal from the RF signal to further output the AISG signal and the DC signal to the SBT.

In some embodiments, the AISG signal, the DC signal, and the RF signal may be input to the phase shifter through the RF port. After being processed by the phase shifter, the AISG signal, the DC signal, and the RF signal may be input to the first filter. The first filter may further filter out the RF signal to output the AISG signal and the DC signal to the SBT.

In some embodiments, the first filter may include one of a low-pass filter, a band-pass filter, or a band-stop filter, which may be selected according to actual needs.

In the present disclosure, the filter circuit may be electrically connected to the antenna elements located at the edge of the antenna array. Since radiation at the edge of the antenna array is relatively weak, a risk of passive intermodulation (PIM) may be minimized.

In addition, the first filter may be configured to extract the AISG signal and the DC signal from any one of the output terminals at both ends of the phase shifter. As such, on one hand, the return wave loss and insertion phase of the RF signal may be reduced to minimize the impact on the performance of the antenna array. On another hand, the output terminals at both ends of the phase shifter may be lower in power with several dB less compared to other output terminals, such that the first filter may easily reach a predetermined isolation specification, e.g., 40 dB, to relax the isolation requirement for the first filter.

In connection with FIGS. 1 and 2, each output terminal of the phase shifter is coupled to the antenna element in a plurality of manners. As shown in FIG. 1, each output terminal of the phase shifter is directly coupled to an antenna element. As shown in FIG. 2, each output terminal of the phase shifter is coupled to at least two antenna elements through a power divider. In some embodiments, a quantity of antenna elements coupled to an output terminal of the phase shifter may be determined according to actual needs.

Figure 3:
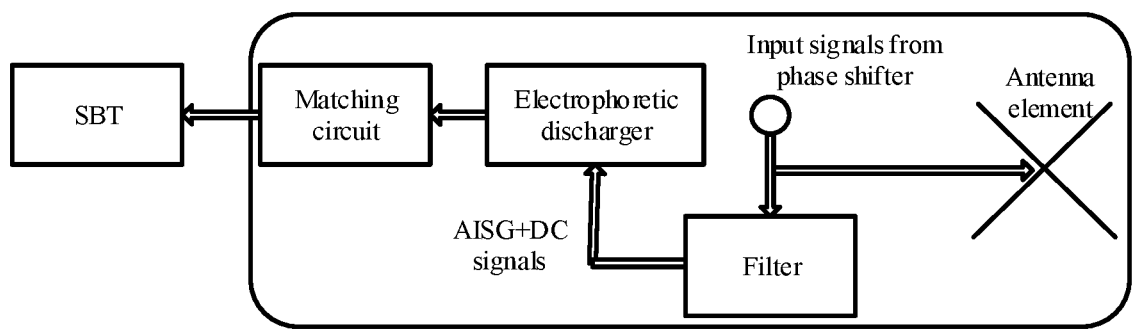
FIG. 3 is a schematic structural block diagram showing a printed circuit board of an integrated filter circuit according to some embodiments of the present disclosure.

As shown in FIG. 3, the filter circuit further includes an electrophoretic discharger D and a matching circuit 20. An input terminal of the electrophoretic discharger D is coupled to an output terminal of the first filter 10. An output terminal of the electrophoretic discharger D is coupled to an input terminal of the matching circuit 20. An output terminal of the matching circuit 20 is coupled to the SBT. The electrophoretic discharger D may be configured to limit a transient overvoltage and discharge a surge current. The matching circuit 20 may be configured to match the AISG signal of 2 to 2.3 MHz.

Figure 4:
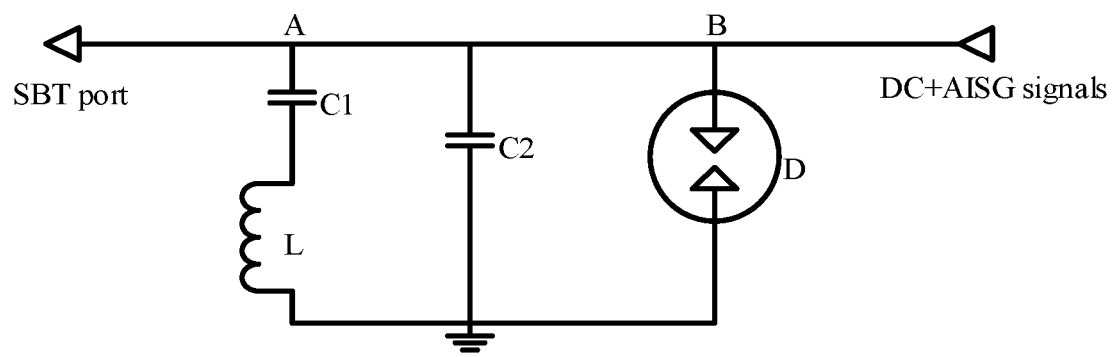
FIG. 4 is a schematic diagram showing an electrical principle of a matching circuit and an electrophoretic discharger according to some embodiments of the present disclosure.

In some embodiments, as shown in FIG. 4, the matching circuit 20 includes a first capacitor C1, a second capacitor C2, and an inductor L. One end of the first capacitor C1 is electrically connected to the SBT to form a first node A. An opposite end of the first capacitor C1 is grounded through the inductor L. One end of the electrophoretic discharger D is electrically connected to the output terminal of the first filter 10 to form a second node B. An opposite end of the electrophoretic discharger D is grounded. The second capacitor C2 is included in the matching circuit 20 to further prevent the RF signal from passing through. The first node A and the second node B are electrically connected. An end of the second capacitor C2 is electrically connected between the first node A and the second node B. An opposite end of the second capacitor C2 is grounded. The first capacitor C1, the second capacitor C2, and the electrophoretic discharger D share a common ground terminal.

Figure 5:
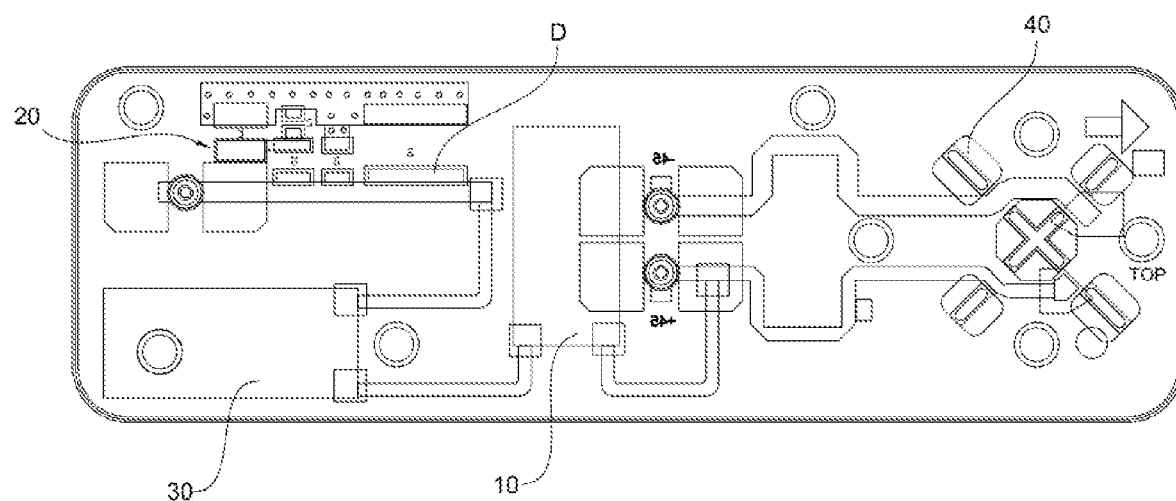
FIG. 5 is a schematic diagram showing a printed circuit board of an integrated filter circuit according to some embodiments of the present disclosure.

Further, as shown in FIG. 5, to enhance filter efficiency, the filter circuit includes a second filter 30. The second filter 30 is coupled between the first filter 10 and the electrophoretic discharger D. The second filter 30 may include one of a low-pass filter, a band-pass filter, or a band-stop filter, which may be selected according to actual needs.

Further, FIG. 5 shows a layout of a filter circuit on a circuit board. The circuit board includes a feed network. The filter circuit and the feed network are integrated on the circuit board. As shown in FIG. 5, one output signal of the phase shifter is directly coupled to the antenna element 40. Another output signal of the phase shifter is directly coupled to the filter circuit. The first filter 10, the second filter 30, the electrophoretic discharger D, and the matching circuit 20 of the filter circuit are integrated on the circuit board. During implementation, a single circuit board may only need to be modified to add a filter circuit, which saves space and makes the addition of the filter circuit more convenient.

Further, the base station antenna may further include a reflector. The circuit board and the antenna element may be mounted on the reflector together. The circuit board may include at least one antenna element through welding. During implementation, a quantity of the antenna elements may be set according to actual needs.

Figure 6:
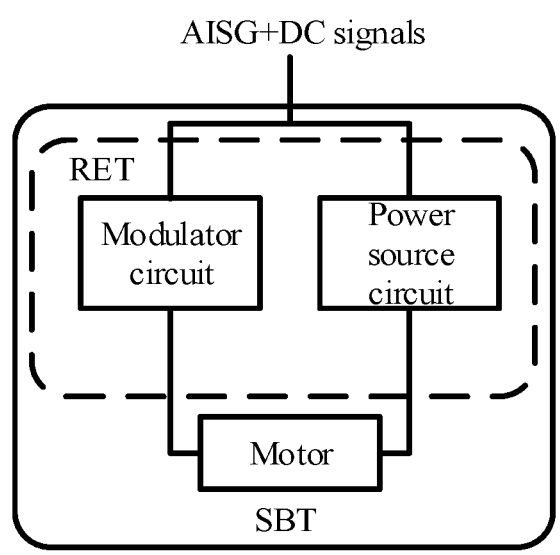
FIG. 6 is a schematic structural block diagram of a smart bias tee (SBT) according to some embodiments of the present disclosure.

As shown in FIG. 6, the SBT includes a remote electrical tilt (RET) module and a motor. The RET module may be configured to provide the antenna with an electric tilt function. The motor may be configured to control a downward tilt angle of the antenna. Further, the RET module includes a modulator circuit and a power source circuit. The modulator circuit may be configured to demodulate the AISG signal of 2-2.3 MHz to control the motor. The power source circuit may be configured to provide power to the motor according to the DC signal. During implementation, the modulator circuit may be configured to control the motor to perform controls the motor to perform actions after processing the AISG signal to adjust the downward tilt angle of the antenna.

In the present disclosure, the filter circuit is arranged at the edge of the antenna array. Thus, a distance from the SBT to the filter circuit may be the shortest, and the SBT and the filter circuit may be easily connected to each other.

The technical contents and features of the present disclosure are disclosed above. Those skilled in the art should still make replacements and modifications without departing from the spirit of the present disclosure based on the teaching and embodiments of the present disclosure. Therefore, the scope of the present invention should not be limited to the content disclosed by embodiments of the present disclosure but include various replacements and modifications without departing the present disclosure and should be subjected to the claims of the invention.

What is claimed is:

1. A base station antenna comprising:
    a smart bias tee (SBT);
    an antenna array including a plurality of antenna elements;
    a phase shifter including a plurality of output terminals, each of the plurality of output terminals being coupled to an antenna element; and
    a filter circuit including a first filter, an input terminal of the first filter being coupled to either one of output terminals of two ends of the phase shifter, the output terminals being coupled to the SBT, and the output terminals of the two ends of the phase shifter having lower power compared to other output terminals.

2. The base station antenna of claim 1, wherein the filter circuit is electrically connected to antenna elements at an edge of the antenna array.

3. The base station antenna of claim 1, wherein:
    signals entering the first filter include an antenna interface standards group (AISG) signal, a direct current (DC) signal, and a radio frequency (RF) signal; and
    the first filter is configured to filter out the RF signal.

4. The base station antenna of claim 1, further comprising:
    a power divider, at least two antenna elements of the antenna array being coupled to an output terminal of the phase shifter through the power divider.

5. The base station antenna of claim 1, wherein the filter circuit further includes:
    an electrophoretic discharger; and
    a matching circuit configured to match an AISG signal, an input terminal of the matching circuit being coupled to the first filter through the electrophoretic discharger, and an output terminal of the matching circuit being coupled to the SBT.

6. The base station antenna of claim 5, wherein the matching circuit includes:
    a first capacitor, an end of the first capacitor being electrically connected to the SBT to form a first node, an end of the electrophoretic discharger being electrically connected to an output terminal of the first filter to form a second node electrically connected to the first node, an opposite end of the electrophoretic discharger being grounded;
    a second capacitor, an end of the second capacitor being electrically connected between the first node and the second node, and an opposite end of the second capacitor being grounded; and
    an inductor, an opposite end of the first capacitor being grounded through the inductor.

7. The base station antenna of claim 5, wherein the filter circuit further includes:
    a second filter configured to enhance filter efficiency, the second filter being coupled between the first filter and the electrophoretic discharger.

8. The base station antenna of claim 1, wherein the SBT includes:
    a remote electrical tilt (RET) module configured to provide an electrical tilt function for the antenna; and
    a motor configured to control a downward tilt angle of the antenna.

9. The base station antenna of claim 8, wherein the RET module includes:
    a modulator circuit configured to perform modulation on an AISG signal to control the motor; and
    a power source circuit configured to provide power to the motor according to a DC signal.

10. The base station antenna of claim 1, further comprising:
    a circuit board including a feed network, the filter circuit and the feed network being integrated on the circuit board.

11. The base station antenna of claim 10, further comprising:
    a reflector, at least one antenna element being welded on the circuit board, and the antenna element and the circuit board being mounted on the reflector together.

* * * * *